United States Patent
Mofakhami

(10) Patent No.: US 8,083,904 B2
(45) Date of Patent: Dec. 27, 2011

(54) SYSTEM FOR CATION-ELECTRON INTRUSION AND COLLISION IN A NON-CONDUCTIVE MATERIAL

(75) Inventor: Arash Mofakhami, Buthiers (FR)

(73) Assignee: Ceram Hyd, Avon (FR)

( * ) Notice: Subject to any disclaimer, the term of this patent is extended or adjusted under 35 U.S.C. 154(b) by 1118 days.

(21) Appl. No.: 11/570,555

(22) PCT Filed: Jun. 15, 2005

(86) PCT No.: PCT/FR2005/001499
§ 371 (c)(1),
(2), (4) Date: Oct. 4, 2007

(87) PCT Pub. No.: WO2006/003328
PCT Pub. Date: Jan. 12, 2006

(65) Prior Publication Data
US 2008/0160359 A1 Jul. 3, 2008

(30) Foreign Application Priority Data
Jun. 15, 2004 (FR) .................................... 04 06477

(51) Int. Cl.
*C25B 9/00* (2006.01)

(52) U.S. Cl. ......... 204/155; 204/242; 205/340; 205/637

(58) Field of Classification Search .................. 204/155, 204/242; 205/340, 637
See application file for complete search history.

(56) References Cited

U.S. PATENT DOCUMENTS

| 4,107,008 A * | 8/1978 | Horvath .................... 205/339 |
| 4,146,446 A | 3/1979 | von Sturm |
| 4,229,196 A | 10/1980 | Woollam |
| 4,265,721 A * | 5/1981 | Hackmyer .................... 205/340 |
| 4,427,512 A | 1/1984 | Han |
| 4,466,820 A | 8/1984 | Clarke |
| 5,718,819 A * | 2/1998 | Peschka et al. .................... 205/339 |
| 5,900,330 A | 5/1999 | Kagatani |
| 6,071,644 A | 6/2000 | Ikemachi et al. |
| 6,211,643 B1 | 4/2001 | Kagatani |
| 6,459,231 B1 | 10/2002 | Kagatani |
| 7,909,968 B2 * | 3/2011 | Hallenbeck .................... 204/275.1 |

(Continued)

FOREIGN PATENT DOCUMENTS

EP 1 074 785 A1 2/2001

(Continued)

OTHER PUBLICATIONS

International Search Report from International Application No. PCT/FR05/01499 dated Oct. 20, 2005.

(Continued)

*Primary Examiner* — Alexa D. Neckel
*Assistant Examiner* — Nicholas A. Smith
(74) *Attorney, Agent, or Firm* — O'Brien Jones, PLLC

(57) ABSTRACT

A device for colliding at least one H+ ion and at least one electron may comprise at least one electromagnetic field generator for extracting the at least one H+ ion from a hydrogen-containing compound and transferring the at least one H+ ion toward a cathode. The device also may comprise at least one non-conductive material positioned between at least a portion of the hydrogen-containing compound and the cathode so that the colliding of the at least one H+ ion and the at least one electron occurs within the non-conductive material.

25 Claims, 4 Drawing Sheets

U.S. PATENT DOCUMENTS

| | | |
|---|---|---|
| 2002/0022162 A1 | 2/2002 | Kagitani |
| 2003/0167778 A1 | 9/2003 | Bradley et al. |
| 2004/0018632 A1 | 1/2004 | Shabana et al. |
| 2006/0204829 A1 | 9/2006 | Ovshinsky et al. |
| 2007/0080058 A1 | 4/2007 | Matsumoto et al. |

FOREIGN PATENT DOCUMENTS

| | | |
|---|---|---|
| WO | WO 2005/052215 A1 | 6/2005 |

OTHER PUBLICATIONS

Abstract and bibliographic data corresponding to EP 1 074 785 A1, Feb. 7, 2001.

Amiri et al., "Etude théorique et expérimentale de l'action d'un champ électrique sur la diffusion des ions chlorures dans les bétons," $15^{ADDAC;Age}$me Rencontres Universitaires de Génie Civil, Strasbourg, May 9-10, 1997, pp. 259-265.

"Hydrides and intermetallics," printed on Oct. 4, 2007 from http://www.lemtr.lcmtr.cnrs.fr/gb/Hydrures__et__intermetalliques__anglais.html, pp. 1-3.

First Office Action dated Dec. 19, 2008 from corresponding Chinese Application No. 2005800198238 (9 pages), with English Translation (8 pages).

* cited by examiner

SYSTEM FOR CATION-ELECTRON INTRUSION AND COLLISION IN A NON-CONDUCTIVE MATERIAL

The present invention relates to the field of manipulating particles by electric, magnetic, and electromagnetic fields in matter.

More particularly, the present invention relates to a device for intrusion of H+ ions and electrons into a non-conductive material to encourage their low energy collisions.

The prior art discloses the principle of electrolysis to produce hydrogen. FIG. 1 shows the general principle of electrolysis. A cathode is placed in acidulated water, for example. Under the effect of an electric current, H+ ions in the water are attracted to the cathode. The cathode then releases electrons which, together with the H+ ions, form hydrogen atoms then hydrogen molecules. The presence of hydrogen is visible by the appearance of bubbles in the liquid. Part of that hydrogen can penetrate into the cathode by diffusion, depending on the physico-chemical characteristics of the cathode.

In U.S. Pat. No. 4,466,820, electrolysis is used to extract ions from a ceramic. The various charged ions are then attracted towards the cathode or the anode depending on their charge.

The disadvantage of those prior art electrolysis methods for producing hydrogen or for migrating particles is that the hydrogen atoms cannot be stored after they have been produced and they escape, for example in the form of micro bubbles of gas.

The present invention encompasses, inter alia, applications that overcome this disadvantage of the prior art using the principle of electrolysis to store hydrogen other than in conventional pressurized gas tanks.

Experiments with hydrogen storage in metal hydrides have already been carried out by CNRS laboratories (http://ulysse.glvt-cnrs.fr/lcmtr/hydrures.html). The concept underlying those experiments is that many metals and intermetallic compounds can absorb hydrogen reversibly under conditions close to ambient pressure and temperature. They form hydrides with a hydrogen storage capacity of at least one hydrogen atom per metal atom. By way of comparison, this capacity is volumetrically double that of liquid hydrogen. Metal hydrides have been studied both from the point of view of their fundamental properties and of their applications. Intermetallic compounds are obtained by co-fusion of pure elements in a controlled atmosphere in a high frequency induction furnace, an arc furnace, or by mechanical synthesis. Hydrides of those compounds are synthesized by reaction with gaseous hydrogen in volumetric apparatus (Sievert's method). Said experimental devices can determine the thermodynamic properties of the hydriding reaction (equilibrium pressure, capacity, enthalpy, and entropy of formation). Hydrides may also be synthesized in an electrochemical reaction by dissociating a molecule of water, which process is widely used in alkaline Ni—MH type batteries. The structures of the intermetallic compounds and their hydrides are characterized by X-ray and neutron diffraction. Their physical properties are studied by magnetic measurements, Mossbauer spectroscopy and X-ray absorption.

More generally, the prior art also discloses ion transfer processes in porous materials. The publication by O. Amiri, A. Aït-Mokhtar, A. Seigneurin, A. Ammar-B entitled "Etude théorique et experimentale de l'action d'un champ électrique sur la diffusion des chlorures dans les bétons" [Theoretical and experimental study of the action of an electric field on the diffusion of chlorides in concrete], 15$^{th}$ Rencontres Universitaires de Génie Civil, Strasbourg, May 9-10, pp 259-265, 1997 covers the principal ionic transport mechanisms interacting with the electrocapillary adsorption layers of electrolyte contained in a pore structure, for example.

The device of the invention can store hydrogen in a non-conductive material (for example crystals or ceramics) not by a hydriding reaction but by inserting H+ ions into a material in the presence of a cathode and an electric transfer field (FIG. 4).

The present invention is particularly suited to low energy collision (from a few electron volts to a few hundred electron volts) of at least one H+ ion with an electron which, bearing in mind the predetermined selected electric and magnetic field conditions and the choice of non-conductive material, can create a neutron to obtain a low energy neutron source, for example.

The present invention is also particularly suited to low energy collision of an H+ ion and an electron which, bearing in mind the predetermined selected electric and magnetic field conditions and the choice of non-conductive material, can create a hydrogen atom within a non-conductive material to produce a hydrogen storage unit, for example.

To this end, the present invention is of the type described above and is remarkable, in its broadest aspect, in that it provides a device for colliding at least one H+ ion and at least one electron starting from a hydrogen-containing compound and at least one cathode, the device being characterized in that it comprises:
 at least one electromagnetic field generator for extracting said H+ ion from said hydrogen-containing compound and transferring said H+ ion towards said cathode; and
 at least one non-conductive material positioned between at least a portion of said hydrogen-containing compound and said cathode;
 said collision occurring within said non-conductive material.

Preferably, said electromagnetic field generator is constituted by two conductive plates placed at a potential difference.

In one embodiment, said cathode is integral with one of said conductive plates.

In one embodiment, said hydrogen-containing compound is an aqueous acidic electrolytic solution.

In one of the embodiments, said hydrogen-containing compound is a liquid, solid, or gaseous compound, or a plasma.

Advantageously, said non-conductive material is a ceramic.

Preferably, said non-conductive material is constituted by at least one layer of ceramic.

Advantageously, said non-conductive material is constituted by at least one layer of crystal and at least one layer of ceramic.

In one embodiment, said ceramic comprises hexagonal boron nitride (HBN).

In a variation, said non-conductive material covers at least part of said cathode.

In a further variation, said non-conductive material covers the whole of said cathode.

Preferably, said non-conductive material prevents any contact between said hydrogen-containing compound and said cathode.

Preferably, the device also includes an anode.

In one embodiment, the energy of said H+ ion within said non-conductive material is such that said collision causes the production of a neutron.

In a further embodiment, the energy of said H+ ion within said non-conductive material is such that said collision causes the production of a hydrogen atom.

The invention also provides a method of producing at least one hydrogen atom starting from a hydrogen-containing compound and at least one cathode, the method being characterized in that it comprises at least the following steps:

positioning at least one non-conductive material between at least part of said hydrogen-containing compound and said cathode;

extracting at least one H+ ion from said hydrogen-containing compound; and inserting said H+ ion into said non-conductive material, said H+ ion colliding with at least one electron supplied by said cathode within said non-conductive material.

Preferably, the step for extracting at least one H+ ion from said hydrogen-containing compound is carried out by means of an electromagnetic field.

Advantageously, said step for inserting said proton into said non-conductive material is carried out by ion transfer.

The invention can be better understood from the following description, made purely by way of illustrative explanation, of an embodiment of the invention made with reference to the accompanying figures in which.

Figure 2:
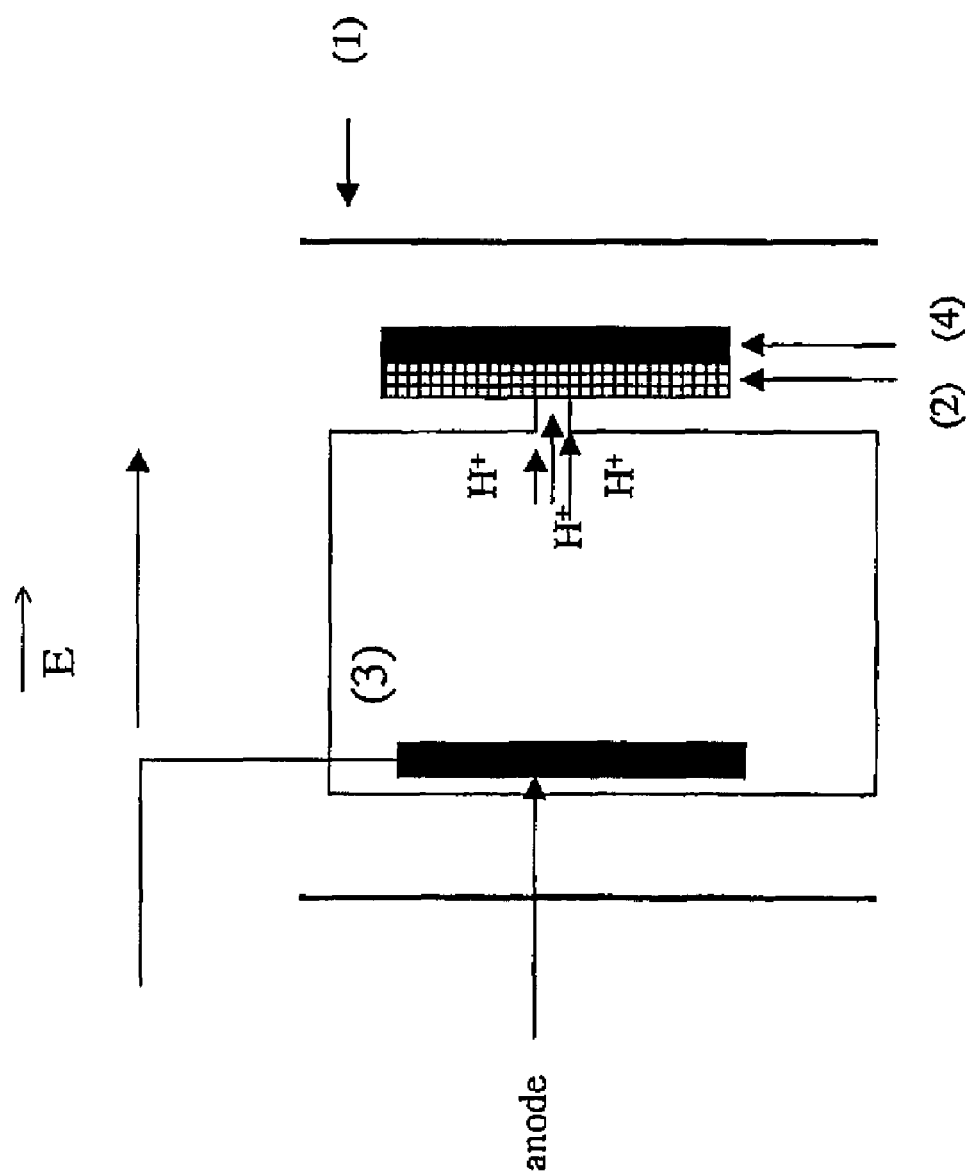
FIG. 2 shows an embodiment of the invention.

In an embodiment shown in FIG. 2, the device of the invention comprises an electric field generator 1 optionally associated with a magnetic field generator, a solid, liquid, or gas type element 3 containing all or part of the hydrogen in ionic, plasma, gaseous, liquid, or solid form, and a cathode plate 4 such that the non-conductive material 2 is positioned between the cathode plate 4 and the element 3 containing hydrogen in at least one of the forms cited above. Optionally, the cathode plate 4 and the electromagnetic field generators may be integrated into a single element.

The general principle of the above device is that the electromagnetic field produced by the generator 1 creates, accelerates, and orientates H+ ions (protons or ions of isotopes of hydrogen such as deuteron or triton) from the different states of hydrogen contained in the element 3. The non-conductive material 2 is orientated so that, under the action of these forces, the H+ ions (protons) penetrate into the material before coming into contact with the cathode.

Since the material 2 is non-conductive, the electrons released by the cathode will not pass through the material and join up with the hydrogen-based substance, which would provoke a conventional electrolysis reaction as in water, for example. Thus, the presence of this material serves to "hold" electrons so that they do not pass into the electrolyte and can thus produce a favorable seat of reaction between H+ ions and electrons.

Within the non-conductive material, electrons e⁻ are then supplied to the H+ ions (protons) by means of the cathode plate 4. The H+ ions (protons) thus capture these electrons for transformation into hydrogen, thus producing a hydrogen storage unit within the non-conductive material 2.

It should be noted that experimentally, said penetration of electrons into the non-conductive material revealed by the appearance of a current in the system.

Compared with conventional electrolysis systems, since the material 2 is non-conductive, electrons cannot join up with H+ ions solely under the effect of an electric current. The electric field produced by an electric generator thus allows these H+ ions to move towards the cathode plate via the non-conductive material 2.

When the H+ ions approach the cathode plate, electrons are detached from the cathode plate and are directed towards these ions through the non-conductive material because of the electrostatic effects of the ions. The physical principles behind such a phenomenon are well known—the quantum mechanical tunneling effect, electronic micro breakdown, or field theory electrostatic emissions.

Figure 1:
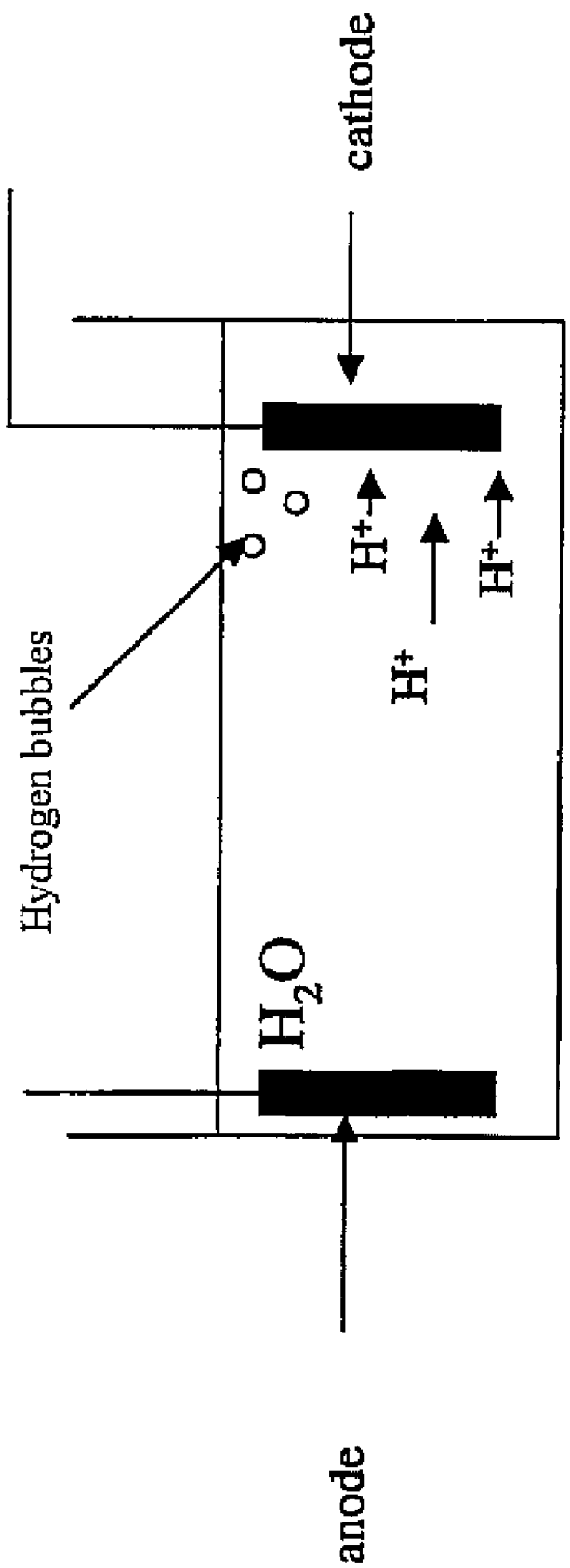
FIG. 1 shows the principle of electrolysis and the production of hydrogen in the prior art.

Finally, the cathode plate must have no zone of contact whatsoever with the hydrogen-containing compound so as to avoid causing a reaction within the substance. Thus, for example, the device includes a hole as shown in FIG. 1 to allow H+ ions to pass through but to prevent any contact between them and the cathode.

Further, to isolate the cathode from the external environment, which cathode is placed at a potential difference therefrom, it is partially covered with an insulator which, for example, prevents ion transport through air and thus prevents loss of the electrons required for the collision reaction. This insulator may, for example, be the non-conductive material 2 itself, or any other insulating material.

The above general principle clearly only applies if the various parameters for the fields and the materials used are fully controlled.

A specific embodiment is described below by fixing various parameters of the above device in the context of storing hydrogen in a non-conductive ceramic or crystal type material.

It should be understood that the invention is not dependent on the type of non-conductive material used. In particular, the device can be adapted to a succession of layers of ceramics of the same type or of different types, or to a succession of crystal layers or even to a succession of layers of ceramic and crystal.

For a distance "d" between two 3 mm [millimeter] plates and a high voltage source which can be varied between 1000 volts and 30000 volts, the maximum electric field obtained is $$E = \Delta V/D = 10^7 \text{ V/m}$$

Figure 3:
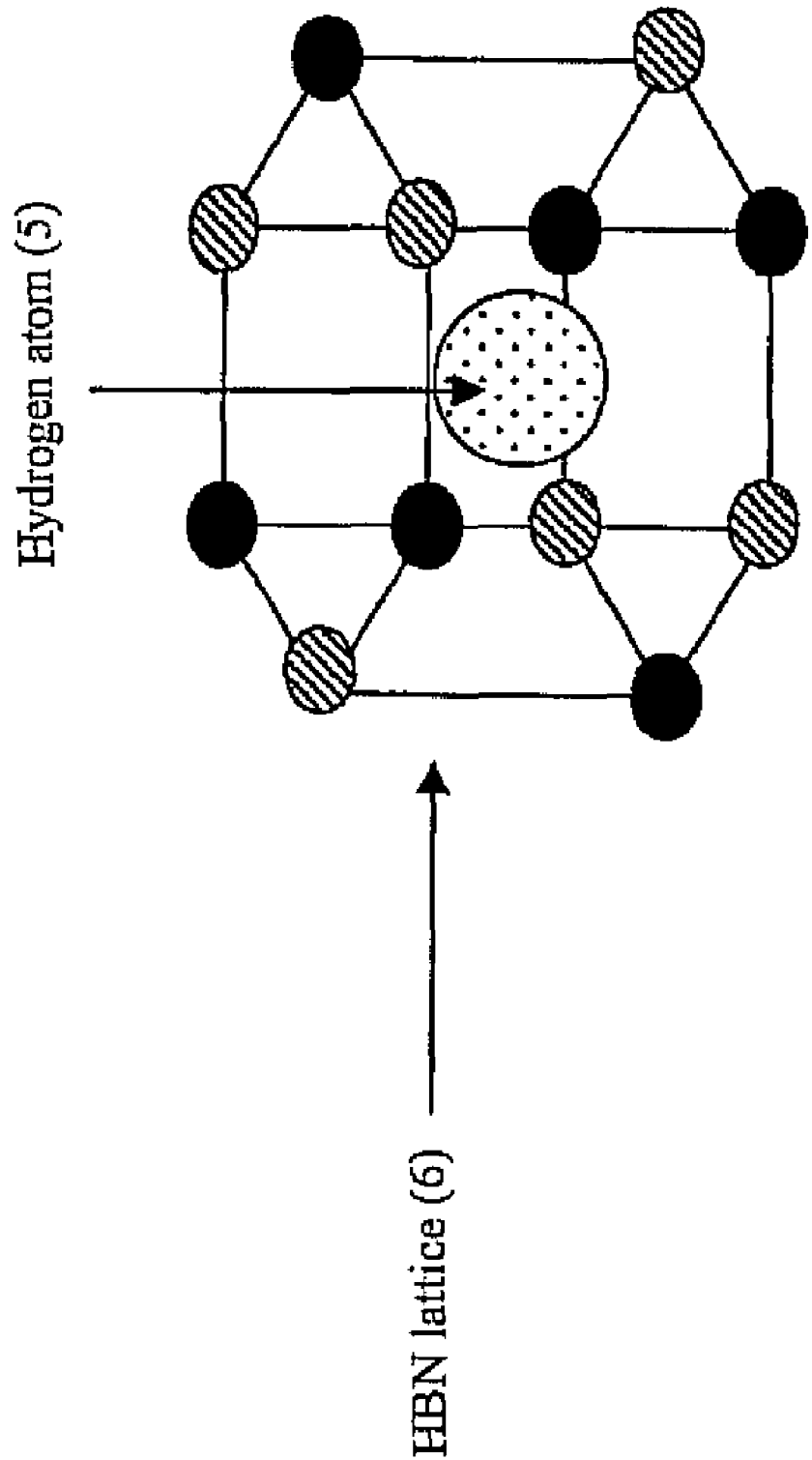
FIG. 3 shows intrusion of a hydrogen atom into a crystal lattice.
Figure 4:
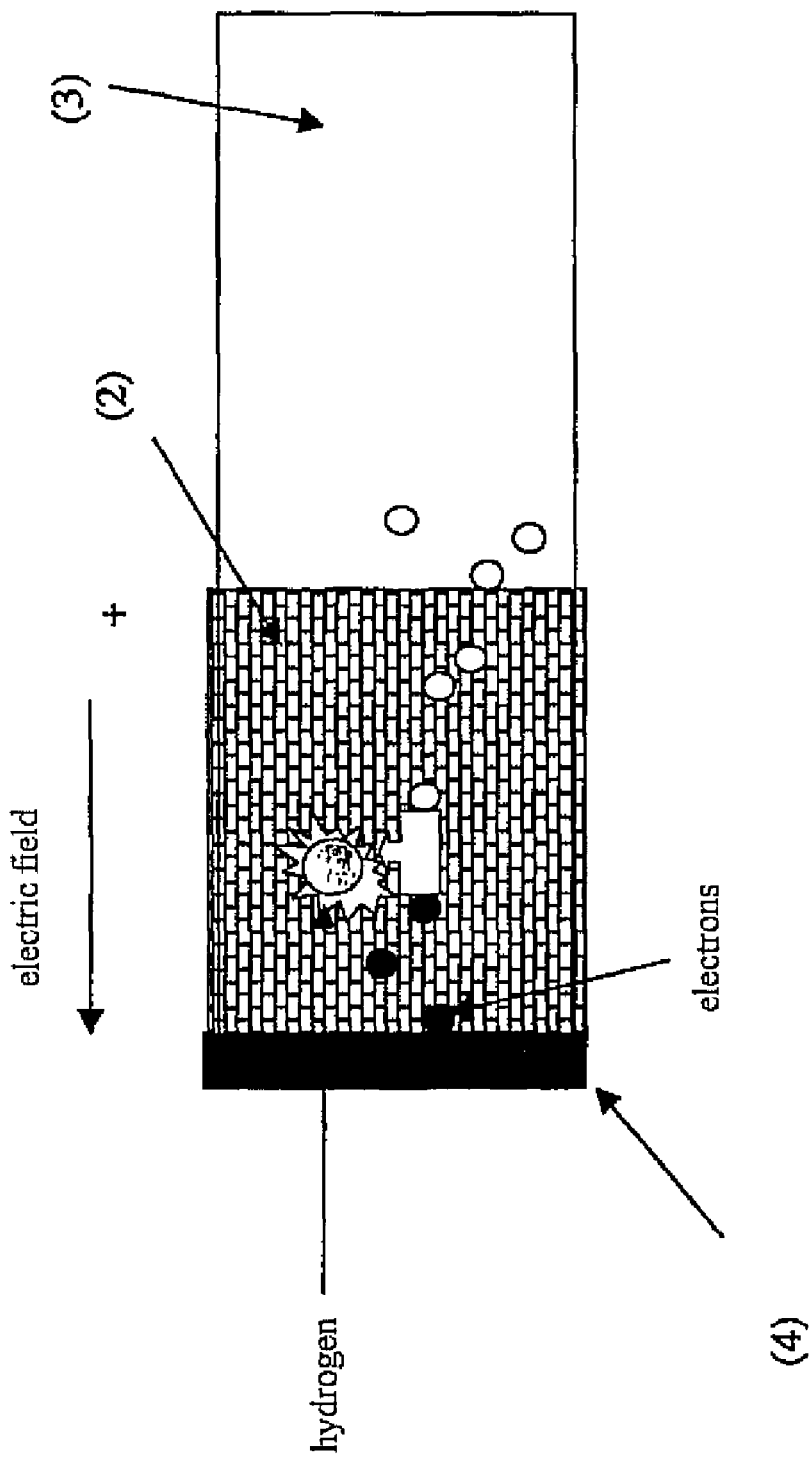
FIG. 4 shows the mechanism regarding the formation of a hydrogen atom inside a non-conductive material on approaching the cathode plate.

As can be seen in FIG. 3, the non-conductive material 2 used is, for example, hexagonal boron nitride, HBN, having physico-chemical characteristics which are suitable for containing hydrogen. Modeling the lattice using Van der Waals radii for the atoms makes it possible to calculate, to a first approximation, the actual space that is available for the hydrogen to occupy. This space is well suited to the Van der Waals radius of atomic or molecular hydrogen.

It should be noted that the Van der Waals radii of the atomic state and the molecular state of hydrogen are equal, so it is possible not only to form hydrogen atoms within the non-conductive material, but also hydrogen in the molecular state.

The source of hydrogen 3 is an aqueous acidic solution $H_3O^+$ which can provide a sufficient quantity of H+ ions. As an example, it is obtained from sulfuric acid ($H_2SO_4$) by the reaction:

$$H_2SO_4 + 2H_2O \rightarrow SO_4^{2-} + 2H_3O^+$$

With the aid of a sufficient quantity of energy due to a suitable field intensity, H+ ions can be torn from the water molecules to which they are bound by electric forces (hydrogen bonds). Even if the voltage at the terminals of the plates of the electric device has to be increased, the electric field E can at least statistically tear some of the H+ ions (protons) from the aqueous solution.

The force generated by the electric field of the device ($10^7$ V/m) is theoretically much lower than the hydrogen bond energy of protons in water. However, since H+ ions can move between molecules or aggregates of water molecules, it is possible to extract a portion of these ions even with a force deriving from a field which is lower than the H bond.

It should also be noted that preferably, the device also contains an anode which can neutralize the medium. When H+ ions are extracted from sulfuric acid, the difference in charge created by the preponderance of negatively charged $SO_4^{2-}$ ions tends to retain H+ ions by electrostatic attraction and to prevent them from being directed towards the non-conductive material. By attracting the negatively charged $SO_4^{2-}$ ions, the anode can thus neutralize the medium, which is favorable to the migration of H+ ions for the production of hydrogen. In this specific mode, the electromagnetic field is generated by the anode and cathode plates which are raised to a high voltage.

In this embodiment, the cathode plate (4) may be integral with the high voltage plate (1) corresponding to the direction of movement of the H+ ions under the action of the electric field E.

The electric field generated by the device then attracts H+ ions into the ceramic by a known ion transfer type mechanism.

Since the ceramic HBN is an electrical insulator, the H+ ion passes through the ceramic to approach the cathode plate. When it is a few nanometers from the cathode plate, it is transformed into hydrogen by capturing an electron derived from the cathode plate, as shown in FIG. 3.

The ceramic thus constitutes a hydrogen storage unit which may, for example, be used as an energy vector, for example in a fuel cell.

In particular, inside a fuel cell, the non-conductive material used in the invention becomes a re-fillable hydrogen tank.

The effect of temperature, for example 300K, is to give the hydrogen atoms kinetic energy which allows them to move from lattice to lattice within the non-conductive material where they are stored. The ceramic thus releases the hydrogen which it contains little by little by diffusion and on heating due to the cell operating. The diffusion time may also be controlled depending on the lattice size of the non-conductive material. The denser the ceramic, the longer the hydrogen diffusion time.

Finally, it should be noted that depending on the energy supplied to the H+ ion and thus the force of the electromagnetic field on the hydrogen-containing compound, the reaction in the non-conductive material of the H+ ion and an electron is a nuclear reaction producing a neutron.

The non-conductive material thus becomes a neutron source following collision between low energy protons and electrons emitted by the cathode.

The above description of the invention is given by way of example. It is clear that the skilled person is at liberty to produce different variations of the invention without in any way departing from the scope of the patent.

The invention claimed is:

1. A device for colliding at least one H+ ion and at least one electron,
   the device comprising:
   at least one electromagnetic field generator for extracting the at least one H+ ion from a hydrogen-containing compound and transferring the at least one H+ ion toward a cathode; and
   at least one non-conductive material positioned between at least a portion of the hydrogen-containing compound and the cathode so that the colliding of the at least one H+ ion and the at least one electron occurs within the non-conductive material.

2. The device of claim 1, wherein the field generator comprises two conductive plates placed at a potential difference.

3. The device of claim 2, wherein the cathode is integral with one of the conductive plates.

4. The device of claim 1, wherein the hydrogen-containing compound comprises an aqueous acidic electrolytic solution.

5. The device of claim 1, wherein the hydrogen-containing compound comprises a liquid compound.

6. The device of claim 1, wherein the hydrogen-containing compound comprises a solid compound.

7. The device of claim 1, wherein the hydrogen-containing compound comprises a gaseous compound.

8. The device of claim 1, wherein the hydrogen-containing compound comprises a plasma.

9. The device of claim 1, wherein the non-conductive material comprises a ceramic.

10. The device of claim 1, wherein the non-conductive material comprises at least one layer of a ceramic.

11. The device of claim 1, wherein the non-conductive material comprises at least one layer of a crystal and at least one layer of a ceramic.

12. The device of claim 9, wherein the ceramic comprises hexagonal boron nitride.

13. The device of claim 1, wherein the non-conductive material covers at least part of the cathode.

14. The device of claim 1, wherein the non-conductive material covers substantially the entire cathode.

15. The device of claim 1, wherein the non-conductive material is configured to prevent any contact between the hydrogen-containing compound and the cathode.

16. The device of claim 1, wherein an energy of the at least one H+ ion in the non-conductive material causes the colliding to produce at least one hydrogen atom.

17. The device of claim 1, wherein an energy of the at least H+ ion in the non-conductive material causes the colliding to produce at least one neutron.

18. A system comprising:
    the device of 1; and
    a fuel cell supplied with hydrogen released from the device.

19. A method of colliding at least one H+ ion and at least one electron, comprising:
    positioning at least one non-conductive material between at least a portion of a hydrogen-containing compound and a cathode;
    extracting at least one H+ ion from the hydrogen-containing compound; and
    inserting the at least one H+ ion into the non-conductive material, the at least one H+ ion colliding with at least one electron supplied by the cathode within said non-conductive material.

20. The method of claim 19, further comprising extracting the at least one H+ ion from the hydrogen-containing compound using an electromagnetic field.

21. The method of claim 19, further comprising inserting the at least one $H^+$ ion into the non-conductive material by ion transfer.

22. The method of claim 19, wherein an energy of the at least one H+ ion within said non-conductive material causes the colliding to produce at least one hydrogen atom.

23. The method of claim 19, wherein an energy of the at least one H+ ion within said non-conductive material causes the colliding to produce at least one neutron.

24. The method of claim 19, wherein the non-conductive material is heated to release hydrogen.

25. The method of claim 24, further comprising supplying a fuel cell with the released hydrogen.

* * * * *